W. TSCHUDY.
METHOD FOR CONTROLLING THE EFFICIENCY OF MERCURY RECTIFIERS.
APPLICATION FILED APR. 15, 1913.

1,189,887.

Patented July 4, 1916.

UNITED STATES PATENT OFFICE.

WILLIAM TSCHUDY, OF LYNN, MASSACHUSETTS.

METHOD FOR CONTROLLING THE EFFICIENCY OF MERCURY RECTIFIERS.

1,189,887.  Specification of Letters Patent.  Patented July 4, 1916.

Application filed April 15, 1913. Serial No. 761,315. REISSUED

*To all whom it may concern:*

Be it known that I, WILLIAM TSCHUDY, a citizen of the Swiss Republic, and a resident of the city of Lynn, county of Essex, and State of Massachusetts, have invented certain new and useful Improvements in Methods for Controlling the Efficiency of Mercury Rectifiers, of which the following is a full and clear specification illustrated in the annexed drawings.

The novelty of the method is more fully pointed out in the annexed claims.

My invention relates to the control of the efficiency of mercury rectifiers which, so far as I am aware, has not been controllable up to the present time.

Rectifiers of this type have heretofore been simply connected to the source of alternating current, and the rectified current has been received by the current consumer such as storage batteries or the like, irrespective of the efficiency of the rectifier.

It is the object of my invention to reduce the resistance of a mercury vapor rectifier to the best possible minimum by selecting a particular vapor pressure on which to operate.

My invention also comprises the method for regulating the amount of watts consumed in the compartment of a gas or vapor electric apparatus, especially of a rectifier of large capacity, by changing the pressure in the compartment through admitting or withdrawing the gaseous medium or other suitable equivalent means.

It also comprises a method of changing the wave formed in the compartment of a gas or vapor electric apparatus, especially of a rectifier of large capacity by varying the pressure in the compartment. The improvement in the efficiency of a glass rectifier tube by regulating the pressure is approximately from 7 to 10 per cent. In case of large rectifiers where the regulation is particularly important, the efficiency may be improved more than the above amount.

By my novel method which I shall describe presently it is possible to control the efficiency of such rectifiers such that it can be easily adjusted to the maximum possible efficiency.

Figure 1:
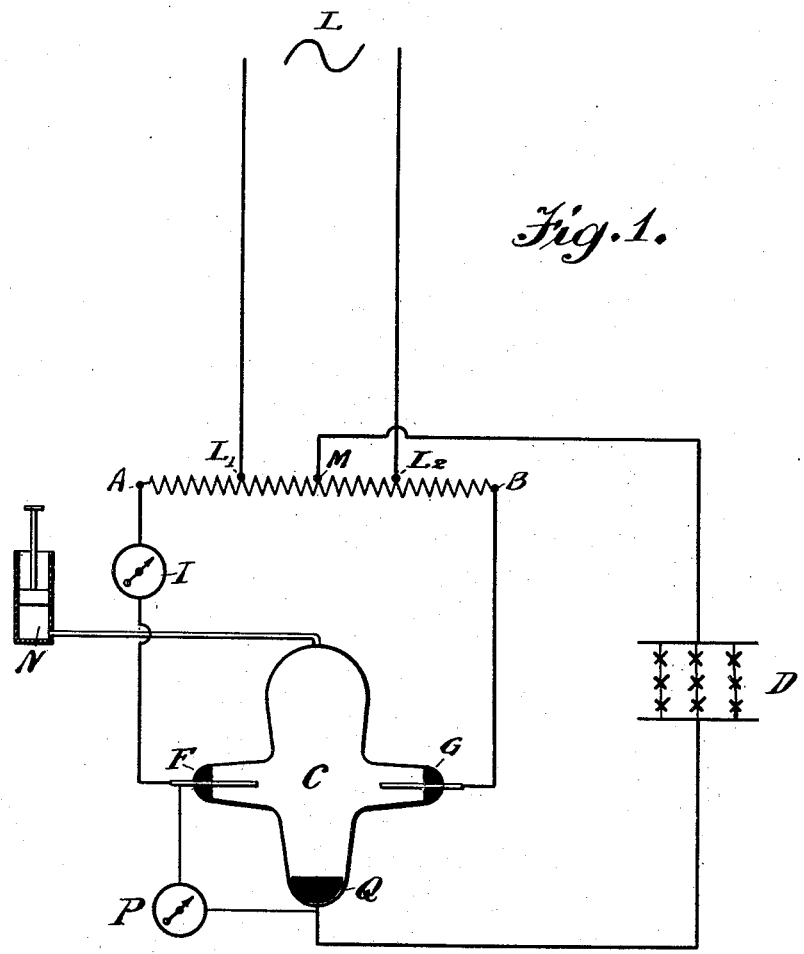
Figure 2:
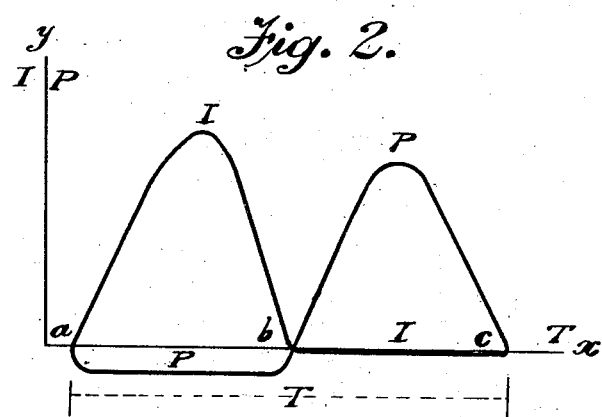

In the accompanying drawings, Figure 1 represents diagrammatically a rectifier and its circuit connection, and Fig. 2 represents a curve diagram of the current and tension curve for one period.

Referring to Fig. 1 C represents the mercury rectifier which is connected at its two anodes F and G with the two terminals A and B of an auto transformer, which in turn is connected at $L_1$, $L_2$ with the line L from which the alternating current is supplied. The mercury cathode Q is connected by way of the direct current consuming device D with the middle terminal M of the transformer. As soon as the vaporization of mercury has started current can flow in the rectifier from the anode F to the mercury cathode Q during one-half period. If now, by suitable means the momentary values of the potential P which exists between anode F and cathode Q, and also the momentary values of the current flowing from terminal A to the anode F are observed experimentally during an entire period T, which is denoted with "T." on the abscissa "X" in Fig. 2, the form of the current and tension curves is obtained, for instance as is shown in Fig. 2. As previously mentioned the time is represented by the abscissa "X" and the values of the current I and the tension P are represented by the Y ordinates. The momentary values of I and P are entered in this coördinate system during one period T. In Fig. 1 the instruments by which I and P are measured are correspondingly indicated with I and P.

From the two curves in Fig. 2 it will be noted that the momentary values of the current curve I during the time period *a—b* are greater than zero; while these values are practically zero during the time period *b—c*. On the other hand the momentary values of the tension curve P are different from zero during both time periods *a—b* and *b—c*.

If now, the tension curve, which has an unsymmetrical course relatively to the time axis X, is mathematically analyzed an equation is obtained of the form:—

$$\triangle p = P_0 + P_1 \sin 2\pi nt + P_2 \sin 2(2\pi nt) + P_3 \sin 3(2\pi nt) \ldots$$

or $$\triangle p = P_0 + \Sigma P_k \sin k\, 2\pi nt, \text{ wherein } k = 1, 2, 3, \text{ etc.}$$

In this equation $P_0$ represents the constant member (direct current component) and $P_k$ the amplitude of the several waves.

Since the current curve I runs likewise unsymmetrically to the time axis X its equation has the form:—

$$i = J_0 + J_1 \sin (2\pi nt - \alpha_1) + J_2 \sin (2.2\pi nt - \alpha_2) \ldots$$

wherein $J_0$ represents the constant member (direct current component) and $J_1$, $J_2$, $J_3$, etc., represent the amplitudes of the several waves, and $\alpha_1$ represents the difference in phase between the first tension curve and the first current curve, $\alpha_2$ the difference between the second tension curve and the second current curve, etc.

Generally the above equation may be written of the form:—

$$i = J_0 + \Sigma J_k \sin (k.2\pi nt - \alpha_k) \text{ wherein } k = 1, 2, 3, \text{ etc.}$$

If now one half of the voltage consumed in vessel C is denoted with $\dfrac{E}{2}$, this loss amounts to:—

$$\frac{E}{2} = \frac{1}{T} \int_0^T i \triangle p\, dt$$

If now the values of $i$ and $p$ as expressed by the above formulas are inserted in this equation we obtain:—

$$\frac{E}{2} = \frac{1}{T} \int_0^T [P_0 + \Sigma P_k \sin k\, 2\pi nt]\, [J_0 + \Sigma J_k \sin (k.2\pi nt - \alpha_k)]\, dt$$

$$= J_0 P_0 + J_1 P_1 \frac{\cos \alpha_1}{2} + J_2 P_2 \frac{\cos \alpha_2}{2} + \ldots$$

Thus by analyzing any of the tension and current curves which may be experimentally obtained the influence of the several members of the last equation on the loss of efficiency in the vessel C may be ascertained.

From a certain current and tension curve obtained by experiment as an example and by subsequently figuring the different values according to the formula for $\dfrac{E}{2}$ the following result was obtained:

$$J_0 . P_0 = +413,5 \qquad J_1 P_1 . \frac{\cos \alpha_1}{2} = -537,0.$$

$$J_2 . P_2 \frac{\cos \alpha_2}{2} = 65,8 \qquad J_3 P_3 \frac{\cos \alpha_3}{2} = 7,8$$

From this example it may be seen that the loss of efficiency in vessel C depends largely upon the curve form, since even the fourth member of the equation (not obtained here) has an effect on the amount of loss in efficiency.

I have now determined by experiment that the curve form depends upon the gas pressure in vessel C. Thus also the loss of efficiency depends upon the pressure in the vessel.

If now, according to the results thus obtained the pressure in vessel C is suitably varied the tension and current curve and simultaneously the efficiency of the rectifier can be varied. The variation of gas pressure may be brought about for instance by pumping a gaseous medium into the vessel C, or by withdrawing it therefrom as the case may be, by means of a pump N or other suitable equivalent means. Thus it is possible to adjust the loss in such rectifiers to a minimum by varying the gas pressure in the rectifier. The consumption of energy is preferably determined by a wattmeter in the usual well-known manner.

The adjustment of the efficiency loss may be of great value if the apparatus is for instance connected to a source of alternating current, the curve form of which is very unfavorable with regard to the efficiency loss; thus by subsequently regulating the vacuum in the rectifier tube the curve form of the tension and the current may be influenced in such manner that the loss in efficiency is a minimum. For instance, in case of a very sharp peak curve of the source of energy the consumed energy of the tube may amount to 210 watts, while in case of a sine curve at the same tension and the same load and otherwise under the same conditions, the consumed energy may only amount to 138 watts.

What I claim is:

1. The method of controlling the wave form transmitted by a mercury vapor apparatus which consists in changing the physical condition of the vapor in said apparatus.

2. The method of controlling the wave form transmitted by a mercury vapor apparatus which consists in varying the pressure or density of the vapor of said apparatus.

3. The method of controlling the efficiency of vapor rectifiers which consists in supplying a varying current flow to the rectifier and varying its form factor by varying the pressure or density of the vapor of the rectifier.

WILLIAM TSCHUDY.

Witnesses:
TIMOTHY A. O'LEARY,
PHILIP A. KILBY.